United States Patent

[11] 3,536,164

| | |
|---|---|
| [72] Inventor | John Samuel Chenhall<br>Port Hacking, New South Wales, Australia |
| [21] Appl. No. | 675,499 |
| [22] Filed | Oct. 16, 1967 |
| [45] Patented | Oct. 27, 1970 |
| [73] Assignee | Elevators Pty. Limited<br>Waterloo, New South Wales, Australia<br>a corporation of Australia |
| [32] Priority | Oct. 18, 1966 |
| [33] | Australia |
| [31] | 12,697/66<br>Pat. 294,655 |

[54] ELEVATOR CONTROL SUPERVISORY SYSTEM
6 Claims, 9 Drawing Figs.

[52] U.S. Cl. ..................................................... 187/29
[51] Int. Cl. ...................................................... B66b 1/22
[50] Field of Search .......................................... 187/29

[56] References Cited
UNITED STATES PATENTS
3,378,107  4/1968  Madison ....................... 187/29

OTHER REFERENCES
Hunt, S.T. and Bedford, R.J. AUTOMATIC CONTROL OF GROUPS OF LIFTS in G.E.C.. Journal, Vol.31, No. 2, 1964. Copy in Group 211

*Primary Examiner* — Oris L. Rader
*Assistant Examiner* — W.E. Duncanson, Jr
*Attorney* — Wenderoth, Lind & Ponack ABSTRACT: An electrical system for controlling in an elevator installation the allocation of landing calls to elevator cars, in which the landings are grouped into sections and a single car is assigned as a guardian for each respective section to respond to a landing call demand as it occurs in that section.

| SECTIONS | UP SECTORS | UP LANDING CALLS | LIFT Nº 1 | LIFT Nº 2 | FLOOR | LIFT Nº 3 | LIFT Nº 4 | DOWN LANDING CALLS | DOWN SECTORS | SECTIONS |
|---|---|---|---|---|---|---|---|---|---|---|
| S1 | US1 | 24<br>23<br>22<br>21<br>20 | | | 25<br>24<br>23<br>22<br>21<br>20 | | □ | 25<br>24<br>23<br>22<br>21<br>20 | DS1<br><br>DS2 | S1 |
| S2 | US2 | 19<br>18<br>17<br>16<br>15<br>14 | | | 19<br>18<br>17<br>16<br>15<br>14 | □ | | 19<br>18<br>17<br>16<br>15<br>14 | DS3<br><br>DS4 | S2 |
| S3 | US3 | 13<br>12<br>11<br>10<br>9<br>8 | | □ | 13<br>12<br>11<br>10<br>9<br>8 | | | 13<br>12<br>11<br>10<br>9<br>8 | DS5<br><br>DS6 | S3 |
| S4 | US4 | 7<br>6<br>5<br>4 | | | 7<br>6<br>5<br>4 | | | 7<br>6<br>5<br>4 | DS7 | S4 |
| | US5 | 3 | □ | | ⟨3⟩ | | | 3 | DS8 | |
| | BS | 2<br>1 | | | 2<br>1 | | | 2 | | |

Patented Oct. 27, 1970

| SECTIONS | UP SECTORS | UP LANDING CALLS | LIFT N° 1 | LIFT N° 2 | FLOOR | LIFT N° 3 | LIFT N° 4 | DOWN LANDING CALLS | DOWN SECTORS | SECTIONS |
|---|---|---|---|---|---|---|---|---|---|---|
| S1 | US1 | 24<br>23<br>22<br>21<br>20 | | | 25<br>24<br>23<br>22<br>21<br>20 | | □ | 25<br>24<br>23<br>22<br>21<br>20 | DS1<br><br>DS2 | S1 |
| S2 | US2 | 19<br>18<br>17<br>16<br>15<br>14 | | | 19<br>18<br>17<br>16<br>15<br>14 | | | 19<br>18<br>17<br>16<br>15<br>14 | DS3<br><br>DS4 | S2 |
| S3 | US3 | 13<br>12<br>11<br>10<br>9<br>8 | □ | | 13<br>12<br>11<br>10<br>9<br>8 | | | 13<br>12<br>11<br>10<br>9<br>8 | DS5<br><br>DS6 | S3 |
| S4 | US4<br>US5<br>BS | 7<br>6<br>5<br>4<br>3<br>2<br>1 | | □ | 7<br>6<br>5<br>4<br>⟨3⟩<br>2<br>1 | | | 7<br>6<br>5<br>4<br>3<br>2 | DS7<br><br>BS | S4 |

FIG.1

JOHN SAMUEL CHENHALL
INVENTOR

By Wenderoth, Lind & Ponack.
Atty's

JOHN SAMUEL CHENHALL.
INVENTOR

ELEVATOR CONTROL SUPERVISORY SYSTEM

This invention relates to supervisory control systems for elevator installations which employ a plurality of cars to service a multistoreyed building.

In modern buildings of this kind it is essential, in order to provide an acceptable elevator service which will satisfy a wide range of traffic variations, that a number of high speed elevator cars must have their movements controlled relative to one another so as to cater for the traffic demands in a manner which will cause the minimum delay to waiting passengers.

The object of this invention is to provide a supervisory control system for controlling the allocation of a number of cars in an elevator installation to respond to demands for service whereby more efficient use is made of the elevator cars.

To this end the invention in one general form provides a supervisory control system for the operation of cars in response to service demands in an elevator installation, said system comprising electrical registering means for calls for service from a plurality of landings which are divided into groups, each group having at least one car normally parked therein for responding preferentially to service demands within its respective group of landing, and means for allocating cars to meet service demands within their respective groups.

The arrangement and control of elevator cars with respect to landings and groups of landings embody the principles of the invention and they are as follows. During normal operation of the elevator installation, the floors of the building are arbitrarily divided into a number of sections or groups normally equal to the number of cars to permit one car to be available for parking in each group of landings. Each group, or section, may contain one or more floors.

The cars so parked are known as the section guardian cars and any car may be chosen as the section guardian car for any group. The first car parked and available in a group, or section, becomes the section guardian car.

As landing calls are registered they are directed into a store register where they are recorded. There may be more than one store register into which the landing calls are directed and these store registers may be graded one with the other to provide priority groups. These store registers are the means of determining which outstanding landing call demand should be attended to by a lift that is not required to attend to a demand in the section of the building it is guarding. As a landing call demand is attended to, its record is removed from the store register and the remaining landing call demands shift in the store register without changing their original relationship. A similar shift occurs should a landing call demand be removed by a car en route to its car call destination, as will be described later. The store registers are thus prepared to accept further landing call demands as they occur. Such a store register has been described in the specification of copending application No. 9905/66.

A car allocated to a landing call demand in a section of the building will attend first to the highest down call or the lowest up call in the section depending on its direction of travel. Once a car has answered its allocated landing call demand it then travels to other landing destinations in response to car call demands, i.e. demands arising from passengers carried by the car. In addition to satisfying these car call demands, the car may be permitted to give service to one or more landing call demands en route to its destination. The number of these landing calls so accepted is determined by the relationship of the number of cars available for assignment, the direction of car travel, and the number of landing call demands ahead of the car in its direction of travel. When a car completes its assignment, i.e. having satisfied all the car calls which have arisen from the original landing call demand allocated, it will park at the last destination floor with its doors closed and will thus be available for allocation to another landing call demand.

If two adjacent sections of the buildings are left without a car following a traffic movement and no outstanding landing call demands are in the store register then a randomly parked car, i.e. a car parked and available in a section of the building that already has a guardian car allotted will be despatched to the nearest of the two adjacent unoccupied sections and parked. If there is no demand for a car for a period of 10 minutes, the motor generator set for this car is shut down and the car is parked without further movement.

When a landing call demand is registered in a section of the building the guardian car allotted to that section and parked within the section will be allocated to the landing call demand. The landing call demand will be attended to and removed from the store register. If a section of the building is unguarded when a landing call demand is registered this registration is recorded in the store register. A randomly parked car will be allocated to an outstanding landing call demand recorded in the store register.

If a guardian car should be available and parked in a section of the building and there is no landing call demand in that section of the building then this guardian car will be allocated to an outstanding landing call demand in the store register. Cars leaving the ground floor in response to passenger destination calls will deal with Up Demand landing calls en route.

During the morning arrival period of the occupants of the building a very heavy demand exists at the ground floor, and it is desirable to give an increased priority to this floor. For this abnormal condition a section guardian arrangement may be dispensed with and all cars as they complete their last car call, may be despatched to the ground floor. This Up Peak condition is automatically determined by a car leaving the ground floor during a predetermined peak period with 80 percent load as detected by the underfloor weighing device.

If during this period, a car is loading at the ground floor and has not reached the 80 percent load or alternatively leaves the ground floor with less than 80 percent load then the allotted car travelling to the ground floor will be permitted to stop for landing call demands en route. The system may be made to revert to normal operation after a predetermined time.

During a Down Peak condition, which is automatically detected by a car leaving a section of the building 90 percent loaded and with no other section guardian cars available, then a car will be returned to this section on completion of its assignment. A car returning to the top section of the building during a Down Peak may be permitted to answer up landing call demands en route.

In order that the invention may be more readily understood an exemplary arrangement involving a 25 landing-four car lift installation embodying a control system of the invention will now be described in greater detail with reference to the accompanying drawings, in which:

FIG. 1 is a diagrammatical representation of such a building divided into floors, sectors and sections;

Figure 8:
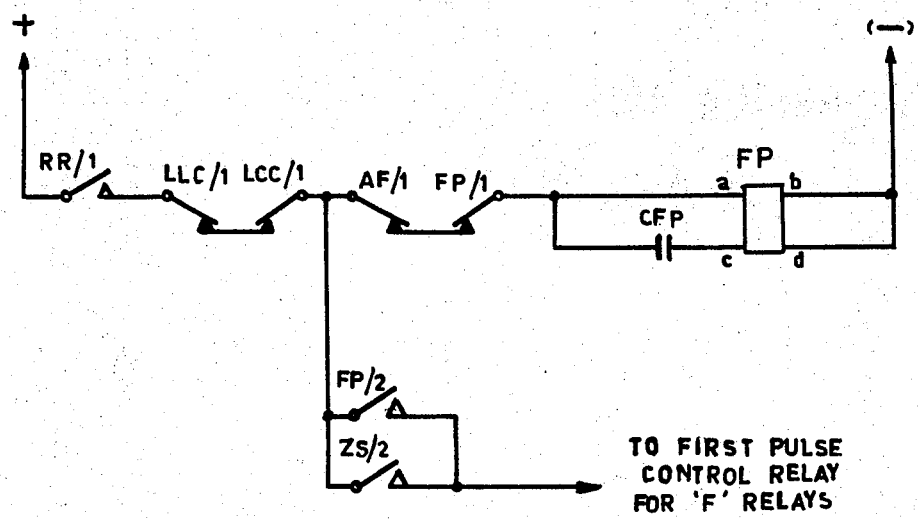
Figure 4A:
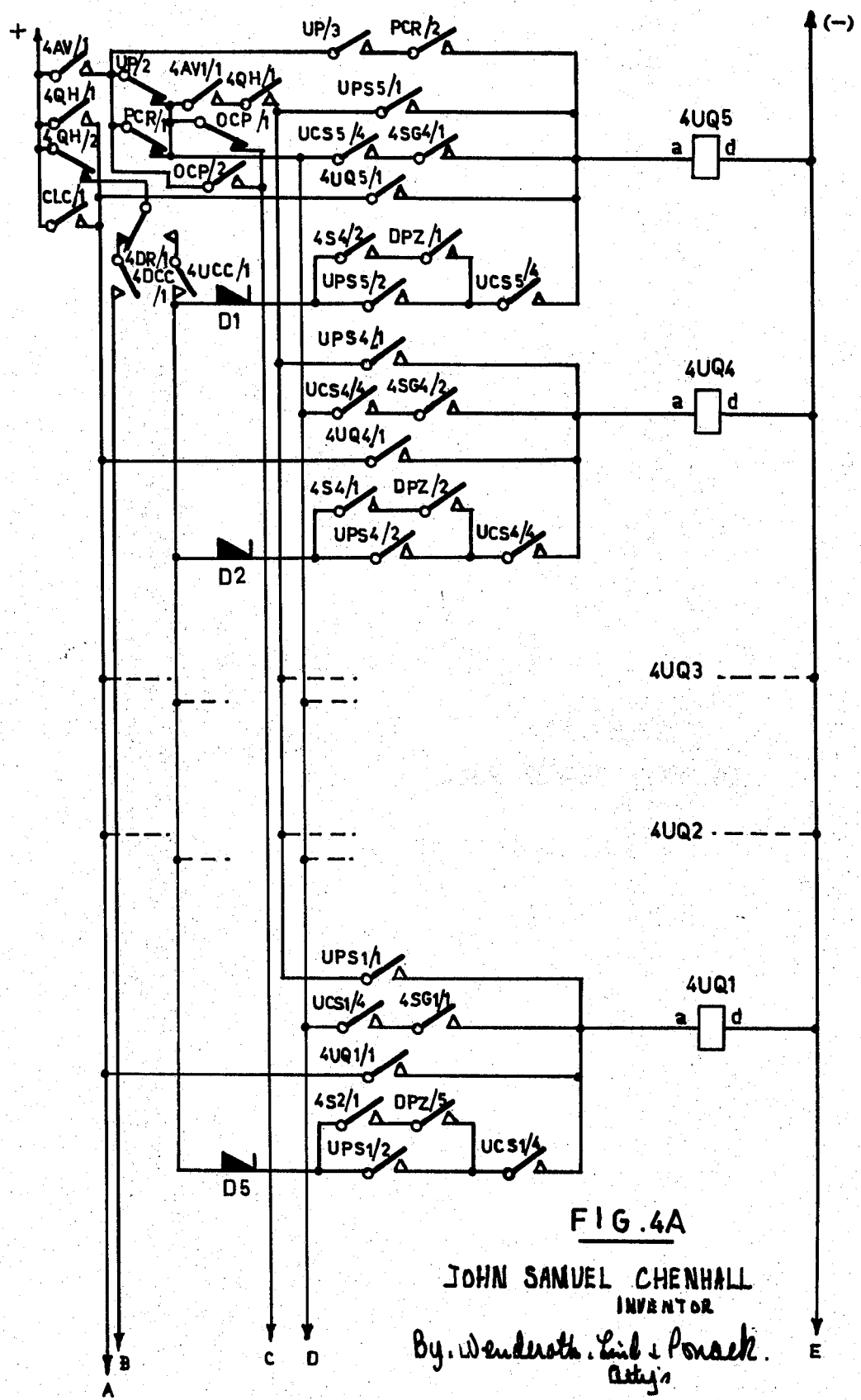
Figure 4B:
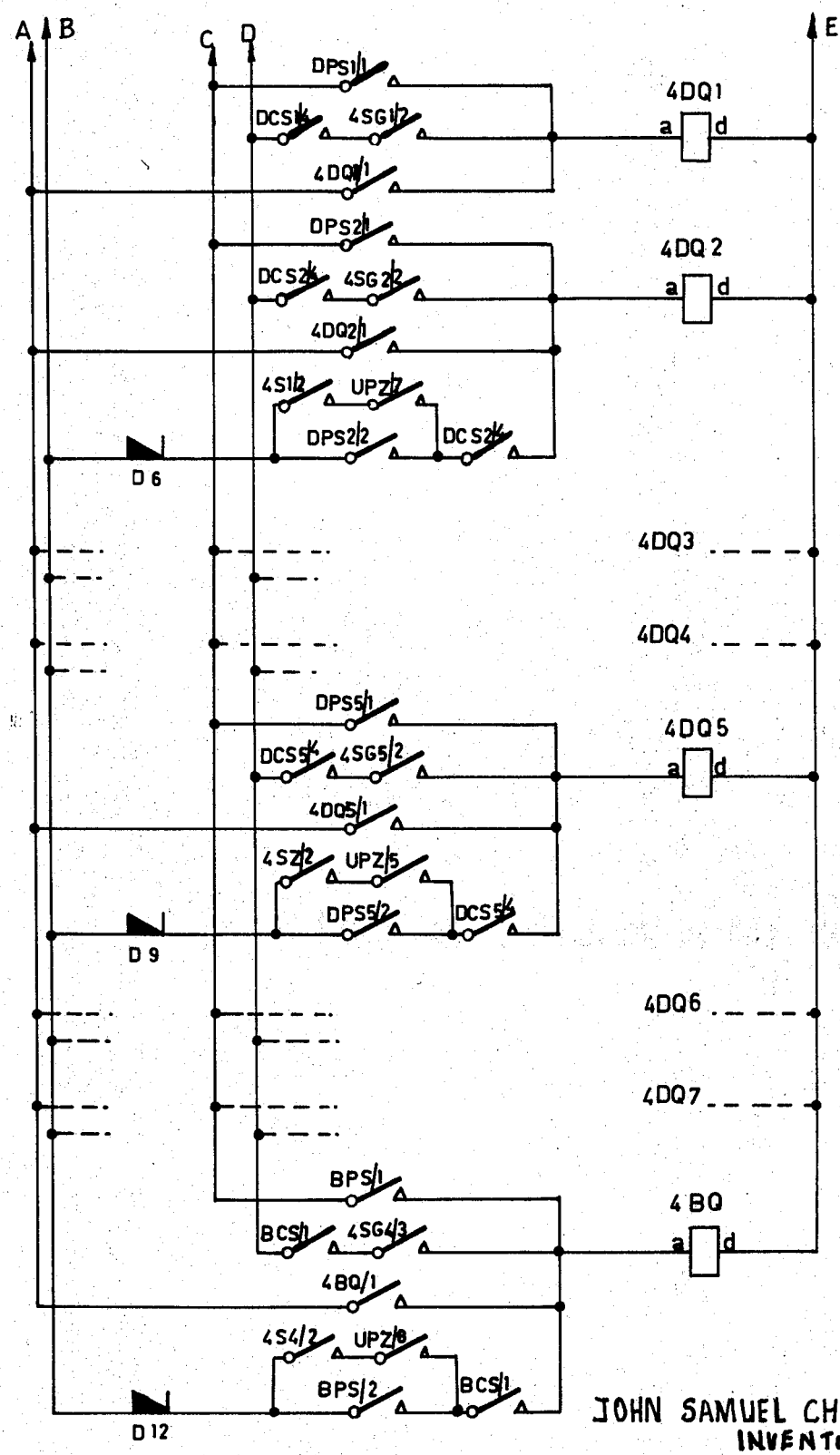
Figure 5:
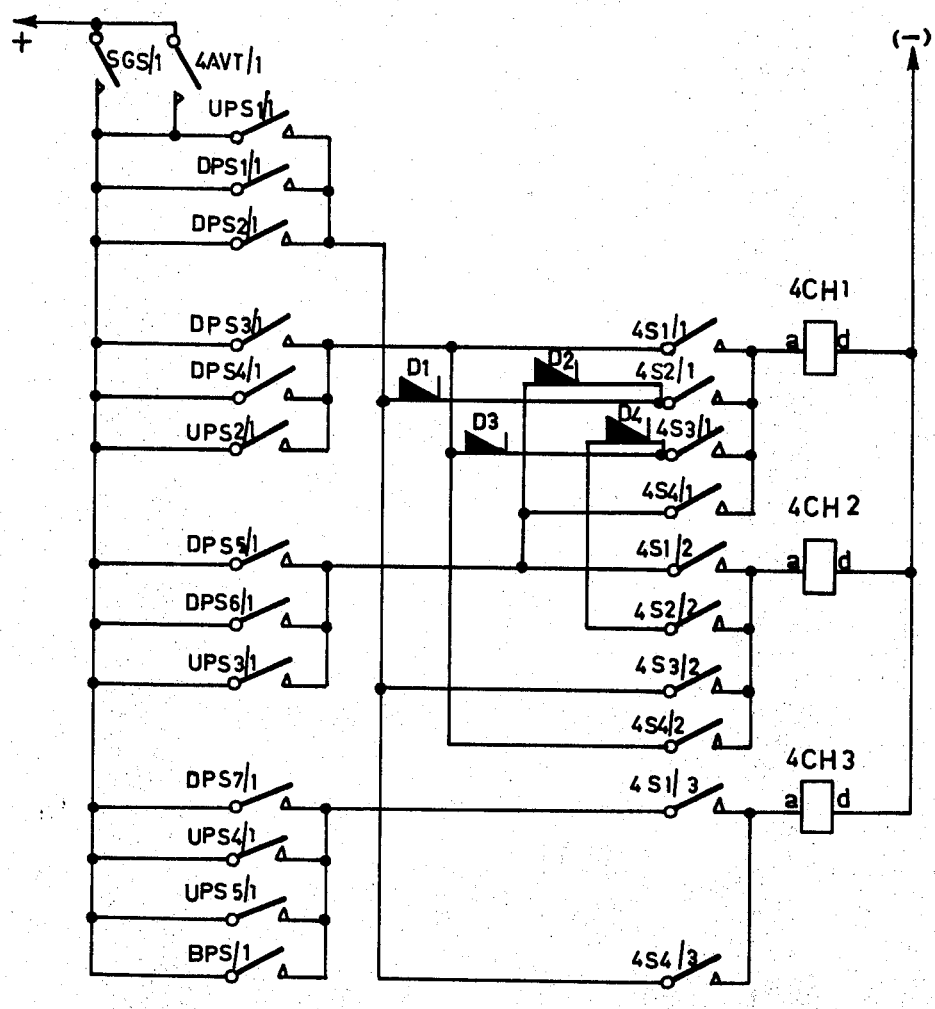
Figure 6:
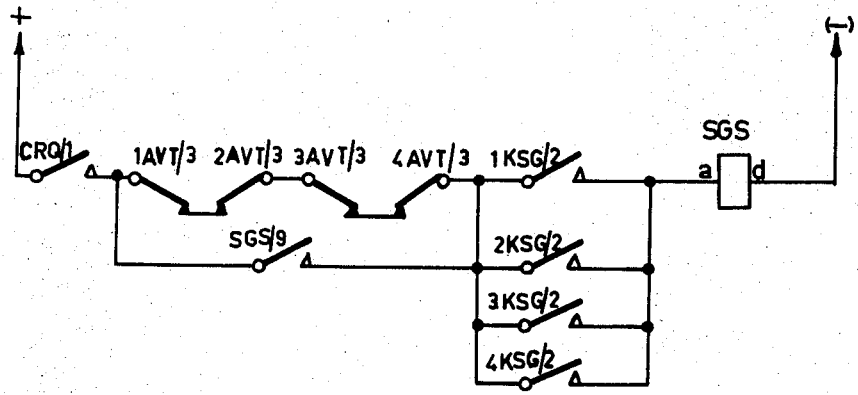
Figure 7:
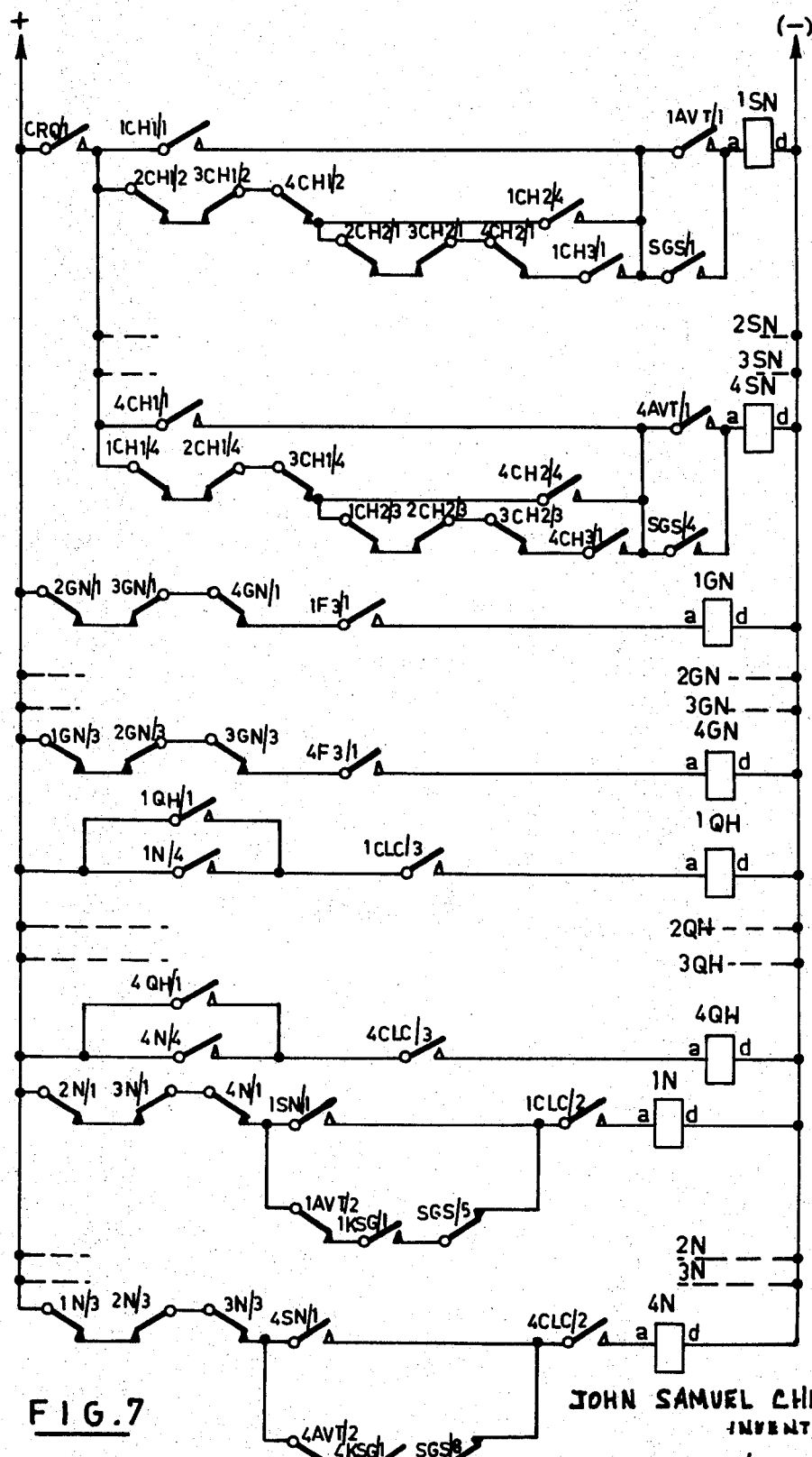

FIGS. 4A and 4B together show a Call allocation circuit of the control system with a Second Assignment Feature;

FIG. 5 depicts the Choice Selection circuit of the control system;

FIGS. 6 and 7 together show the Next Selection circuit of the control system; and, FIG. 8 shows the Advanced Indication circuit thereof.

Several terms are used throughout the specification as a means of convenient identification of integers and conditions existent in and with the present control system. To avoid ambiguity some of these terms are defined as follows.

A "sector" may be either an "up" or "down" sector and refers to the arbitrary grouping of landing call circuits, each sector may comprise one or more call circuits relative to an intended upward direction of travel or one or more call circuits relative to an intended downward direction of travel, by a prospective passenger.

A "section" of the building refers to the arbitrary division of the floors or landings of the building into areas called "sections" or "groups" each of which may comprise one or more floors and two or more "sectors".

A "guardian" car is an elevator car parked in a section and available for service to landings in that section.

A "landing call demand" is the request for lift service made whenever an "up" or "down" landing button is depressed by an intending passenger.

A "car call demand" is the requirement for transport of occupants of the car to a floor corresponding to the destination button in the car which has been depressed.

A "randomly" parked car is a car which has satisfied all demands on it and has become available at a floor in a section already possessing a guardian car.

The following description, and the details depicted in the drawings have been simplified to avoid prolixity and contain only those elements of the system which are relevant to the invention. Other components necessary for the practical working of the control system will be readily appreciated by those skilled in the art.

Throughout the description the following terminology will apply; Relays which are associated with individual elevator cars or lifts will be identified by a lift number used as a prefix to the relay code. Relays which provide a common function for all lifts will not have a prefix number. Each separate contact set on a relay will be identified in the usual manner by a number used as a suffix to the relay code. When the relay code consists of a number of letters followed by a number, the number will generally indicate a sequential repetition of the function represented by the relay. For example 4F21/1 will indicate the contact set 1 of the 21st floor F relay fitted on the No. 4 lift. Similarly 2SG1/3 will indicate the contact set 3 of the SG1 relay fitted on the No. 2 lift.

The car position in the well is identified by the G relays, there being a G relay associated with each floor which will operate each time the car travels from one floor to the next. The car movement is detected by a sensing device attached to the car and a complete description of this car position detector is provided in the specification of copending application No. 12696/66.

A separate set of relays called the floor or F relays operating on the same principle as the G relays are also provided. In addition to the operation of the F relays by the car sensing device a separate means is provided to pulse the "F" relay counter by a pulsing relay "FP". This function is described in more detail under the subheading "Advanced Indication".

Referring now to FIG. 1 a building of 25 floors is diagrammatically shown. Four lifts are shown and the building is divided into four sections. Each section normally contains several sectors and each sector may consist of one or more floors. In the present example section S1 contains up sector US1 and down sectors DS1 and DS2. Thus the sectors have a directional significance, whereas the section contains both up and down sectors. It is also shown that down sector DS1 includes down landing calls from floors 23 to 25 whereas up sector US1 includes calls from floors 20 to 24.

The number and layout of the sections and sectors is dependent on the number of lifts, their speed, the number of floors served, the population density, and many other variables that may apply to such a building. For this reason provision is included in the equipment for the simple alteration of the relationship of floors to sectors and floors to sections by the movement of connections on screw type terminal blocks. This is described in more detail under subheading "Floor, Sector and Section Relationship".

In the present example floor 3 is taken as the Main Terminal floor. All lifts serve all floors and are all assumed to be in service when the power is switched on. The conditions may be varied to illustrate various functions. Lift No. 1 is parked at the 3rd floor, No. 2 at the 10th floor, No. 3 at the 19th floor, and No. 4 at the 21st floor.

FLOOR, SECTOR AND SECTION RELATIONSHIP

Figure 2:
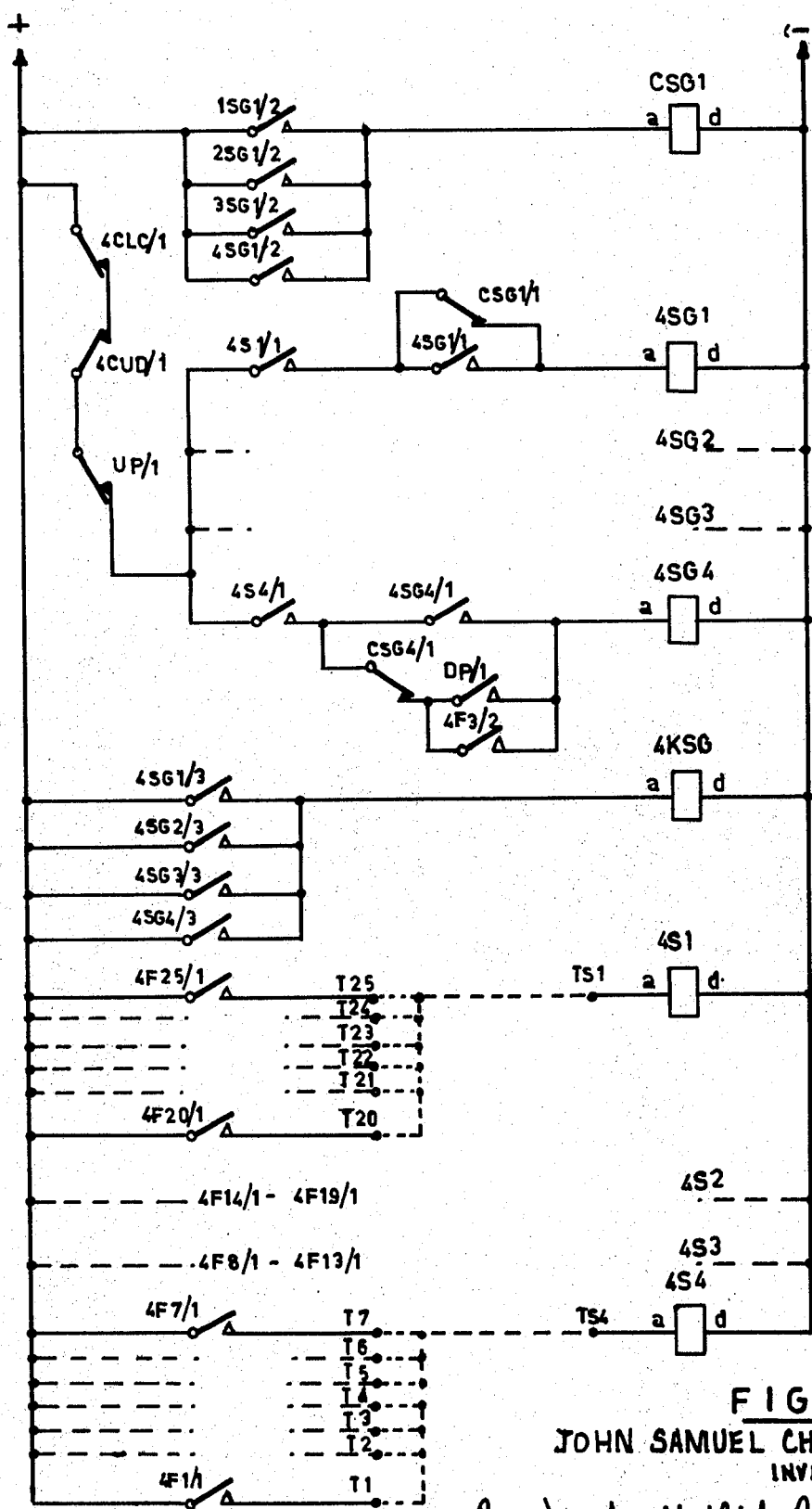
FIG. 2 illustrates schematically a section guardian circuit of a supervisory control system according to the invention as applied to the elevator service for the building of FIG. 1.

The section relays are coded S1 and S4 and reference to FIG. 2 shows that these section relays are operated by the floor relays F. In the present example the contacts of the floor relays 4F1/1 to 4F7/1 of each lift are connected by terminal block connections T1 to T7 to the section relay 4S4. Similarly floor relay contacts 4F8/1 to 4F13/1 are connected by terminal block connections to section relay 4S3, 4F14/1 to 4F19/1 are connected to section relay 4S2 and 4F20/1 to 4F25/1 are connected to section relay 4S1. A similar relationship exists between the conventional landing call relays and the sector relays US1, DS1 etc. and the facility is also provided to vary the relationship between the floors and the sectors by the alteration of terminal block connections.

STORED PRIORITY SECTOR

The stored priority sector demand is only used when no section guardian car is available. If no section guardian car is waiting in a sector when a demand is registered therein, the demand will be placed in the store, and if it advances to the output of the store a randomly parked car, if any, will be assigned to the demand, or if no such car is available, then a section guardian car will be assigned to the demand. A detailed description appears under subheading "Call Allocation". The sector containing landing calls for the longest period of time, and therefore being the first demand registered and advanced to the output of the store, is known as the "Stored Priority Sector" or "Priority Sector". The store register is the subject of Pat. application No. 9905/66, entitled "AN IMPROVED STORE REGISTER FOR SERVICE DEMANDS IN ELEVATOR CONTROL SYSTEMS", and is fully described therein.

Each output of the store is connected to an output relay which keeps its directional significance in its relationship with the sector input. The output relays of the store are called the "up priority sector" or "down priority sector" relays and are related to the sector input by a suffix number, e.g. UPS5 means Up Priority Sector 5 and DPS2 means Down Priority Sector 2. The operation of relay UPS5 means that up sector five US5 has the highest priority for car allocation.

SECTION GUARDIAN CAR

General

A car is designated Section Guardian car when it has completed its previous assignment providing no other car already exists in the same section as a section guardian car. The completion of the previous assignment occurs when the car has dealt with all car calls resulting from the assignment. When a car arrives at section S1, S2 or S3 it becomes the section guardian car for that section by operation of either SG1, SG2 or SG3 relays provided no other car has occupied that section. A car can become section guardian car for sections S1, S2 or S3 at any floor of the section concerned.

During normal operating conditions a car will only become section guardian car for section S4 when it arrives at the main terminal floor. A car completing its assignment in section S4 will be directed to the main terminal floor to become section guardian car for the section. During a Down Peak condition a car can become section guardian at any floor in section S4 similar to other sections. A car becomes section guardian car for section S4 by operation of the SG4 relay.

During an Up Peak condition the use of the Section Guardian arrangement is replaced by the demand for multiple car preference at the main terminal floor. When a car becomes a section guardian car for any section its KSG relay is operated. The car ceases to be the section guardian car when it is assigned to a demand in the building.

DETAILED CIRCUIT DESCRIPTION

The energizing circuit for several relay contacts is not shown for the sake of simplicity. A relay 4CUD, for instance, operates only when a car call is placed, and a relay 4CLC operates only when a landing call is placed. A relay UP operates when an Up Peak condition of operation occurs and a relay DP operates when a Down Peak condition of operation occurs.

Consider, with reference to FIG. 2, car No. 4 parked in section 1 of the building at floor 21. With no car calls placed the relay 4CUD is normal, and with no landing calls to be attended to by this lift and relay 4CLC is normal. The system is considered under normal operating conditions and therefore the Up Peak relay UP is normal. Under those conditions the floor relay 4F21 will be operated. A relay 4S1 is operated by extending positive battery through contact 4F21/1, terminals T21 and TS1, winding $a-d$ of relay 4S1 to negative battery.

A relay 4SG1 is operated by extending positive battery through closed contacts 4CLC/1, 4CUD/1, UP/1, 4S1/1, CSG1/1, winding $a-d$ to negative battery. The relay 4SG1 operated provides a self hold contact 4SG1/1 in parallel with contact CSG1/1. A relay CSG1 is operated by extending positive battery through contact 4SG1/2, winding $a-d$ to negative battery. car No. 4 is now identified as the section guardian car for Section 1.

When the car No. 4 is assigned to a landing call the relay 4CLC operates to open contact 4CLC/1. Similarly if a car call is placed in the car the relay 4CUD operates to open contact 4CUD/1. Either condition causes the relay 4SG1 to release by the disconnection of the positive battery. The relay 4KSG is released by contact 4SG1/3 opening and the relay CSG1 is released by the contact 4SG1/2 opening. The relay 4S1 is released when the floor relay 4F21/1 releases.

A car section guardian relay SG4 can only operate during normal conditions when the car is parked at the main terminal floor. A car parked at the main terminal floor has its F3 relay operated which completes the circuit to the SG4 relay through contact F3/2. During a Down Peak condition parking of a car at the main terminal floor is not required and during this condition the relay DP operates and the contact DP/1 bypasses contact F3/2. During an Up Peak condition the relay UP operates and the contact UP/1 opens preventing operation of relays SG.

AVAILABLE CAR (REFERENCE FIG. 3)

General

When a car completes its previous assignment it will become available after closing its doors. Relay AV will operate to signify that there is no call demand for that car. If another car is already a section guardian car for that section relay KSG will be normal and relay AVT will operate signalling that the car is available to answer demands in sections without a section guardian car.

DETAILED CIRCUIT DESCRIPTION

The energizing circuit for several relays and the relays themselves are not shown for the sake of simplicity. Only their contacts are depicted. A relay 4DO will be normal when the doors of car No. 4 are closed and a relay 4QH will be normal because the lift has not been allocated to a landing call. With no landing calls to be attended to the relay 4CLC will be normal. Consider car No. 4 completing an assignment in section S2 of the building with car No. 3 already identified as section guardian car for car S2. A relay 4AV is operated by extending positive battery through closed contacts 4DO/1, 4CLC/1, 4CUD/1, 4QH/1, winding $a-d$ to negative battery. The relay 4AV is self held by contact 4AV/2 closing.

A relay 4AVT is operated by extending positive battery through contact 4AV/1 closed, 4KSG/1, winding $a-d$ to negative battery. Car No. 4 is now identified as being randomly parked and therefore available to answer demands in sections of the building that do not have a section guardian car.

CALL ALLOCATION (REFERENCE FIGS. 1, 4A and B)

General

When a landing call is registered it may be answered in one of the following ways.

A. SECTION GUARDIAN CAR

If a section guardian car is parked in the section in which a landing call is registered then the landing call is allocated to the section guardian car. If for example an up direction landing call is registered in section S1 of section S1 with car No. 4 identified as the section guardian car the relay 4UQ1 will operate. Relay 4UQ1 operating will allocate the landing calls in sector US1 to car No. 4.

B. NON SECTION GUARDIAN CAR

If no section guardian car is parked in the section in which a landing call is registered then the landing call is directed into the store register and will be assigned in order of placement, as related with other sector demands, to other available cars in the following order of preference. Firstly the nearest available car parked in another section of the building, or secondly a section guardian car from another section. The car best selected to attend to the landing call will depend on a number of possible choices and this process is described in more detail under subheading "Choice Selection".

DETAILED CIRCUIT DESCRIPTION

A. SECTION GUARDIAN CAR

The energizing circuit for several relays is not shown for the sake of simplicity. A relay PCR operates only when a car is required to park at the main terminal floor and a relay OCP operates when only one car is required to attend demands at the main terminal floor. A direction relay DR operates when the car is prepared to travel in the up direction. A relay UPZ and a relay DPZ operate only when an up or down priority landing call exists, and relays UPS1 to UPS5, and DPS1 to DPS5, and BPS only operate when up or down priority sectors exist. Up call in sector relays UCS1 to UCS5, and down call in sector relays DCS1 to DCS7, and basement call relay BCS are only operated when landing calls are registered. Relays UCC and DCC operate only when car calls are registered.

Consider Car No. 4 parked in section S1 of the building and thus identified as the section guardian car for section S1. The relays 4SG1, 4AV and 4S1 are operated. The section relays 4S2 to 4S4 are normal, and the relay UP is normal. Since the car No. 4 is the section guardian car the relay 4AVT is normal. Relay 4QH operates only when the car is allocated to a demand.

Consider a landing call registered in sector US1 of section S1. A relay 4UQ1 is operated by extending positive battery through 4AV/1 closed, UP/2 and PCR/1 in parallel, UCS1/4 closed, 4SG1/1 closed, winding $a-d$ to negative battery. The relay 4UQ1 is self held through its contact 4UQ1/1 and 4QH/1. The relay 4QH operates as soon as the call is registered as described under subheading "Choice Selection". The operation of relay 4UQ1 will complete the allocation of the landing calls in US1 to car No. 4.

B. NON SECTION GUARDIAN CAR

Consider car No. 4 has attended to an assignment and is now parked in section S2 of the building. Car No. 3 is identified as the section guardian car for section S2. The relay 4AVT is operated. Consider a down direction landing call registration in down sector DS2 of section S1 of the building. The relay DCS2 will operate and since no car is identified as section guardian car for section S1 the landing call in down sector DS2 will be directed into the store register and if no other demands are in the store register this demand in down sector DS2 will reach the output of the store register and operate the down priority sector relay DPS2. The "Choice Selection" selects car No. 4 for allocation to the demand and the relay 4QH will operate.

A relay 4DQ2 is operated by extending positive battery through 4AV/1 closed, UP/2 and PCR/1 in parallel, 4AVT/1 closed, 4QH/1 closed, DPS2/1 closed, winding $a-d$ to negative battery. The relay 4DQ2 is self held through its contact 4DQ2/1 and 4QH/1. The operation of relay 4DQ2 will complete the allocation of the landing calls in DS2 to car No. 4.

SECOND ASSIGNMENT FEATURE (REFERENCE FIGS. 1, 4A and B)

General

When a car has answered all landing calls in a sector to which it was assigned it is allowed to be assigned to a second sector in the direction of travel should a demand exist between the first allocated sector and the next car call, and the car has not reached its maximum load. Should more than one sector demand exist in the store register between the first allocated sector and the next car call, and one of these sector demands is the priority sector then the second assignment will be made to the priority sector. The second assignment feature may be repeated any number of times providing the required conditions are fulfilled.

DETAILED CIRCUIT DESCRIPTION

Consider car No. 4 has completed an assignment in sector DS2 and is leaving the sector with a car call for the main terminal floor and a down priority call exists in down sector DS5. The relay DPS5 is operated, the relay DR is normal, the relays 4DCC and DCS5 are also operated. Relay 4QH is normal. A relay 4DQ5 is operated by extending positive battery through contacts 4QH/2, 4DR/1, 4DCC/1 closed, diode D9, contact DPS5/2 closed, DCS5/4 closed, winding $a-d$ to negative battery. The relay 4DQ5 is self held through its contact 4DQ5/1 and CLC/1. The operation of relay 4DQ5 will complete the allocation of the landing calls in down sector DS5 to car No. 4.

If the priority sector in the store register is a demand for travel in the opposite direction of car movement and therefore cannot be accepted by the car the second allocation will be made to the nearest sector demand in the direction of car movement. Consider car No. 4 leaving sector DS2 with a car call for the main terminal floor and an up priority call exists in an up sector, with a down call in sector DS5. The UQ relays cannot operate because their operate circuits are broken by contacts 4AV/1 open and contact 4DR/1 normal. The relay 4DQ5 is operated by extending positive battery through contacts 4QH/2, 4DR/1, 4DCC/1, diode D9, contact 4S2/2 closed, contact UP2/5 closed, contact DCS5/4 closed, winding $a-d$ to negative battery. The operation of relay 4D95 will complete the allocation of the landing calls in down sector DS5 to car No. 4.

CHOICE SELECTION (REFERENCE FIGS. 1 and 5)

General

In a typical building represented by FIG. 1 there are four sections in which any car can park. If a car is identified as the section guardian car one of the possible choices is satisfied and as previously described a call registered in a section of the building containing a section guardian car will be allocated to the section guardian car. If a section does not contain a section guardian car then all available cars must be parked in the remaining sections of the building. For the example taken there would be three possible choices in selecting in which section each car was parked. These choices are designated as the first choice to third choice represented by relays CH1, CH2 and CH3. The choices for each car are related numerically to the demand such that a car which is one section from the demand is choice 1 and a car which is two sections from the demand is choice 2. The car selected for allocation to the demand would be the car with the numerically lowest choice.

When there is only one available car for selection it would be the only choice and be allocated to the demand. If available cars were parked at sections S2 and S3 and a demand was registered in section S1 which did not contain a section guardian car then the car in section S2 would have its relay CH1 operated and the car in section S3 would have its relay CH2 operated. In this case the car in section S2 would be chosen. If there are no available cars a choice is made of the section guardian cars. In this case a relay SGS is operated to close a contact across the contacts AVT/1.

DETAILED CIRCUIT DESCRIPTION

Consider car No. 3 and car No. 4 parked in section S2 of the building with car No. 3 section guardian car and car No. 4 available. The relays 4AVT and 4S2 are operated. Similarly consider car No. 1 and car No. 2 parked in section S3 with car No. 2 section guardian car and car No. 1 available. The relays 1AVT and 1S3 are operated. A landing call is registered in down sector DS1 of section S1. The relay DPS1 will operate. A relay 4CH1 is operated by extending positive battery through contact 4AVT/1 closed, DPS1/1 closed, diode D1, contact 4S2/1 closed, winding $a-d$ negative battery.

In a similar manner for car No. 1 a relay 1CH2 is operated by extending positive battery through contact 1AVT/1 closed, DPS1/2 closed, 1S3/1 closed, winding $a-d$ to negative battery. Thus car No. 4 becomes the choice 1 and car No. 1 becomes the choice 2. Car No. 4 would be the selected car as described in more detail under the subheading "Next Selection".

NEXT SELECTION (REFERENCE FIGS. 6 and 7)

General

When a landing call is registered in a section which does not contain a section guardian car the demand is placed in the store register and will become a priority demand. If one or more cars are available for selection and parked in other sections of the building a "Choice Selection" will occur and a car will be chosen to be the next selected car. If there are no cars available in other sections of the building but one or more section guardian cars exist a similar "Choice Selection" will occur and a section guardian car will be chosen to be the next selected car. If the example is considered which is discussed under subheading "Choice Selection" wherein cars No. 3 and No. 4 are parked in section S2 and cars No. 1 and 2 were parked in section S3, with a demand in section S1, it was shown that car No. 4 was chosen to attend to the landing call demand. The determination of a "Choice Selection" will cause a next selection relay 4SN to operate, which operates a next car relay 4N and a sector allocation relay 4QH. Relay 4QH operating releases 4AV and the landing call is allocated to car No. 4. If there are no cars available relay SGS will operate and a "Choice Selection" made of the section guardian cars.

DETAILED CIRCUIT DESCRIPTION

For the sake of simplicity of explanation the detailed circuitry associated with the operation of a selection required relay CRQ is omitted. The relay CRQ is operated when a selection is required and there is no section guardian car in the section of the building involved. Considering the example stated above, a relay 4SN is operated by extending the positive battery through contacts CRQ/1 closed, 4CH1/1 closed, 4AVT/1 closed, winding $a-d$ to negative battery. Other car next selection relays SN are prevented from operating by the interlocking of the choice selection relays CH. As shown a relay 1SN cannot operate because the circuit from positive battery through the chain of CH contacts is broken by the opening of contact 4CH1/2.

Figure 3:
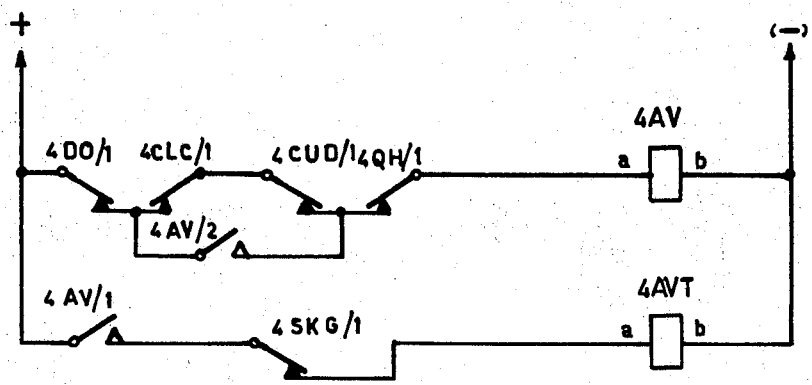
FIG. 3 shows an available car circuit of the control system by schematic diagram.

A relay 4N is operated by extending positive battery through closed contacts 1N/3, 2N/3, 3N/3, contact 4SN/1 closed, contact 4CLC/2 closed, winding $a-d$ to negative battery. A relay 4QH is operated by extending positive battery through contact 4N/4 closed, contact 4CLC/3, winding $a-d$ to negative battery. The relay 4QH is self held by contact 4QH/1, until all calls in the sector to which car No. 4 has been allocated have been answered. The relays 4AV and 4AVT are released by the operation of relay 4QH (FIG. 3) and thus relays CRQ, 4SN and 4N are released.

If there are no cars available then no cars will have their relay AVT operated. Consider all cars except car No. 4 are in service and car No. 4 is the section guardian car parked in section S2 of the building. Consider a landing call demand is registered in down sector DS1 in section S1. The relay 4KSG is operated since car No. 4 is a section guardian car, and relay CRQ is operated when a selection is required. A relay SGS is operated by extending positive battery through contact CRQ/1 closed, closed contacts 1AVT/3, 2AVT/3, 3AVT/3, 4AUT/3, contact 4KSG/2 closed, winding $a-d$ to negative battery. The relay SGS is self held by its contact SGS/9 closing. The operation of contact SGS/1 in FIG. 5 will operate a choice relay CH as described under subheading "Choice Selection". Referring to FIG. 7 the relay 4SN is operated by extending positive battery through contact CRQ/1 closed, contact 4CH/1 closed, contact SGS/4 closed, winding $a-d$ to negative battery. As previously described the operation of 4SN will cause relays 4N and 4QH to operate. The relay SGS is released when the car is no longer a section guardian car. When relay 4QH releases it causes relays CRQ, 4SN and 4N to release.

ADVANCED INDICATION (REFERENCE FIG. 8)

General

So that intending passengers are given the maximum time to assemble at the landing entrance before a car arrives and subsequently reduce the loading time of the car with associated improved system performance, provision is included to illuminate the hall lantern in advance of the car arrival. Normally the hall lantern is illuminated as soon as the landing call is allocated to the car if the car is within six floors of the call or when the car reaches a position six floors from the call in other cases. The range of advanced indication may be increased or decreased to suit particular building situations.

DETAILED CIRCUIT DESCRIPTION

To simplify the understanding of this function the circuits associated with several relays are not shown. A running relay RR operates whenever the lift is in motion. A local landing call relay LLC and local car call relay LCC operate whenever the floor or relays F coincide with a landing or car call, respectively. An advance finished relay AF operates when the relays F have advanced to the maximum allowed limit. A relay ZS is pulsed by the sensing device attached to the car and each time the car moves from one floor to the next this relay operates and releases once. Positive battery is extended through contact RR/1 closed, contacts LLC/1, LCC/1, AF/1, FP/1 closed, winding $a-b$ of relay FP to negative battery. The positive battery is also extended through the parallel path formed by capacitor CFP, winding $c-d$ of relay FP to negative battery. Since capacitor CFP is in the uncharged condition and relay FP windings $a-b$ and $c-d$ are wound in opposite sense the relay FP will not immediately operate. When capacitor CFP charges the current through winding $c-d$ is reduced to a level where relay FP operates on winding $a-b$. The relay FP operating causes its contact FP/1 to open and disconnect the positive battery feed. The relay FP will remain in the operated condition until the capacitor CFP discharges through the windings of the relay FP to eventually release the relay FP. The relay FP releasing closes contact FP/1 and the sequence is repeated. The FP relay will consequently self pulse until either of the closed contacts LLC/1, LCC/1 open when the call has been encountered, or contact AF/1 opens to signal that the maximum allowed limit of advance has been reached.

The floor relays F are operated by the pulsing contact FP/2 the full detailed description of the operation of a counting chain of relays is described in copending application No. 12696/66. If a call has not been encountered during the maximum allowed advance then the contact AF/1 opens to arrest the self pulsing circuit of relay FP and further count on the relays F will be in unison with the count on relays G by the pulsing of the contact ZS/1 as the car moves from one floor to the next. When the called floor is detected by the floor relays F in the advanced condition then contacts of the relays F will operate the appropriate hall lantern in the conventional way. No further movement of the relays F will occur whilst the car moves to the called floor.

PEAK UP DEMAND

General

When a car standing at the main floor loads to a predetermined level of capacity (say 50—60 percent) the service to the main floor is modified automatically to give main floor preference. This preference is achieved by establishing a priority demand at the main floor for two cars to be allocated without the necessity of pressing the landing call push button at the main floor. If only one car is in attendance at the main floor, allocation of cars to up demands is prevented.

When no cars are in attendance at the ground floor, both up and down landing demands will be ignored, unless a car stops at a particular floor to deposit passengers. As soon as one car is in attendance at the main floor, the parking call for the second car is reduced in priority to allow high priority landing calls to be answered, as explained above.

CIRCUIT DESCRIPTION

For the sake of simplicity, circuitry showing the operation of a relay UP, being the up peak relay, is omitted, as also is the means of providing a parking call to bring cars to the main floor without the necessity of a landing call, both features being well established practice. The parking call relay PCR and a one car parked relay OCP (which indicates that one car is in attendance at the main floor) determine whether landing calls, either up or down may be allocated.

With reference to FIG. 4A, in the case in which no cars are at the main floor during up peak the relay UP and the relay PCR will be operated and the relay OCP will be normal. Under these conditions the relay 4UQ5 is operated by extending positive battery through contacts 4AV/1, UP/3, PCR/2 winding $a-d$ to negative battery. Contacts UP/2 and PCR/1 prevent allocation to any other demand as previously explained.

In the case in which one car is at the main floor the relay OCP is operated and this connects positive battery through contact OCP/2 to the down allocation relays 4DQ1 to 4BQ only. When two cars are in attendance at the main floor the relay PCR is normal, as is also the relay OCP, thus contact PCR/1 and OCP/1 supply positive battery to both the UQ and the DQ relays.

PEAK DOWN DEMAND

General

When a down peak is initiated the system acts in the normal manner, except that whilst this condition exists, all up demands will be inhibited in the store to give preference to the down demands. The up demands may well be inhibited until the level of capacity in the downward travelling cars is reduced to a predetermined level (say 50—60 percent of full load).

Any up demand which occurs during this peak down period will be retained in the system and will be dealt with as soon as the downward trend has been catered for. A car leaving the main floor with passengers will operate the second assignment feature in the normal way during this peak down period, and will thus answer any up calls.

I claim:

1. A supervisory control system for a plural car elevator installation in a multistoreyed building having a number of landings divided among a plurality of sections, said control system comprising means for receiving service demands made at the landings, means for assigning a car as it becomes available in a section as a guardian car to that section to respond preferentially to service demands originating therein, means for preventing said assignment if another car is already assigned to said section whereby said car remains parked in said section, store register means for recording in sequence landing service demands arising in sections not containing a guardian car, and means for assigning each said service demand recorded in said register to an idle car in said installation with preference first to parked cars in order of their proximity to the section in which said service demand exists and second to idle section guardian cars in their order of proximity to the section in which the service demand exists.

2. A supervisory control system as claimed in claim 1, wherein a plurality of store registers are provided, each store register recording service demands from individual landings and being accorded a relative priority with respect to other store registers whereby service demands recorded within one store register are allocated to cars before allocation of service demands may proceed from other store registers.

3. A supervisory control system as claimed in claim 1 wherein service demands are recorded in said store register means in chronological sequence, and the record of a service demand in said store register means is removed when it has been assigned to a car, said remaining service demands recorded in said store register means being then advanced in said store register means without change to their chronological sequence.

4. A supervisory control system for a plural car elevator installation in a multistoreyed building having a number of landings divided among a plurality of sections, said control system comprising means for receiving service demands made at the landings, means for assigning a car as it becomes available in a section as a guardian car to said section to respond preferentially to service demands originating therein, means for preventing said assignment if another car is already assigned to said section, means for allocating to said guardian car a service demand arising in said section, said allocation when in respect of a demand for "down" service being a service demand from the highest landing in said section at which a demand for "down" service exists, and when in respect of a demand for "up " service being a service demand from the lowest landing in said section at which a demand for "up " service exists, means for placing said car under the control of service demands arising within the car, and means for allocating to said car when under said control landing demands for service in the same direction of travel as that at which said car is travelling and which are located ahead of said car in its path of travel.

5. A supervisory control system as claimed in claim 4 further comprising store register means for recording landing demands for service which are not allocated to guardian cars in their respective sections, and wherein allocation of said landing demands for service is from said store register means and upon allocation are removed from said store register means.

6. A supervisory control system for a plural car elevator installation in a multistoreyed building having a number of landings divided among a plurality of sections, said control system comprising means for receiving service demands made at the landings, said service demands being divided between "up" and "down" sectors, each of said "up" receiving demands for "up" service from at least one landing and each of said "down" sectors receiving demands for "down" service from at least one landing, each section containing at least one "up" sector and at least one "down" sector, means for assigning a car as it becomes available in a section as a guardian car to that section to respond preferentially to service demands originating therein, means for preventing said assignment if another car is already assigned to said section, store register means for recording service demands from landings irrespective of the intended direction of travel of said service demands, means for allocating to each guardian car a service demand from its respective section which exists at the highest one of the landings where service demands are waiting attention in the "down" sector of said section and a service demand from its respective section which exists at the lowest one of the landings where service demands are waiting attention in the "up" sector of the said section and means for allocating from said store register means service demands for travel in the same direction and in the path of said car as it responds to service demands arising within the car.